Feb. 15, 1949.  E. KOSTKA  2,461,742
WHEEL
Filed June 7, 1946  2 Sheets-Sheet 2

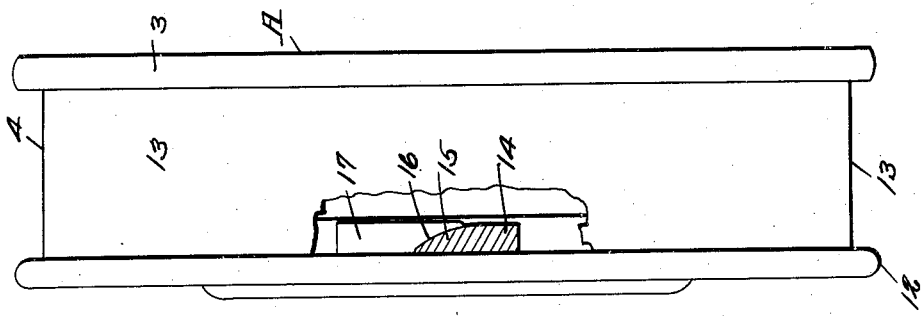
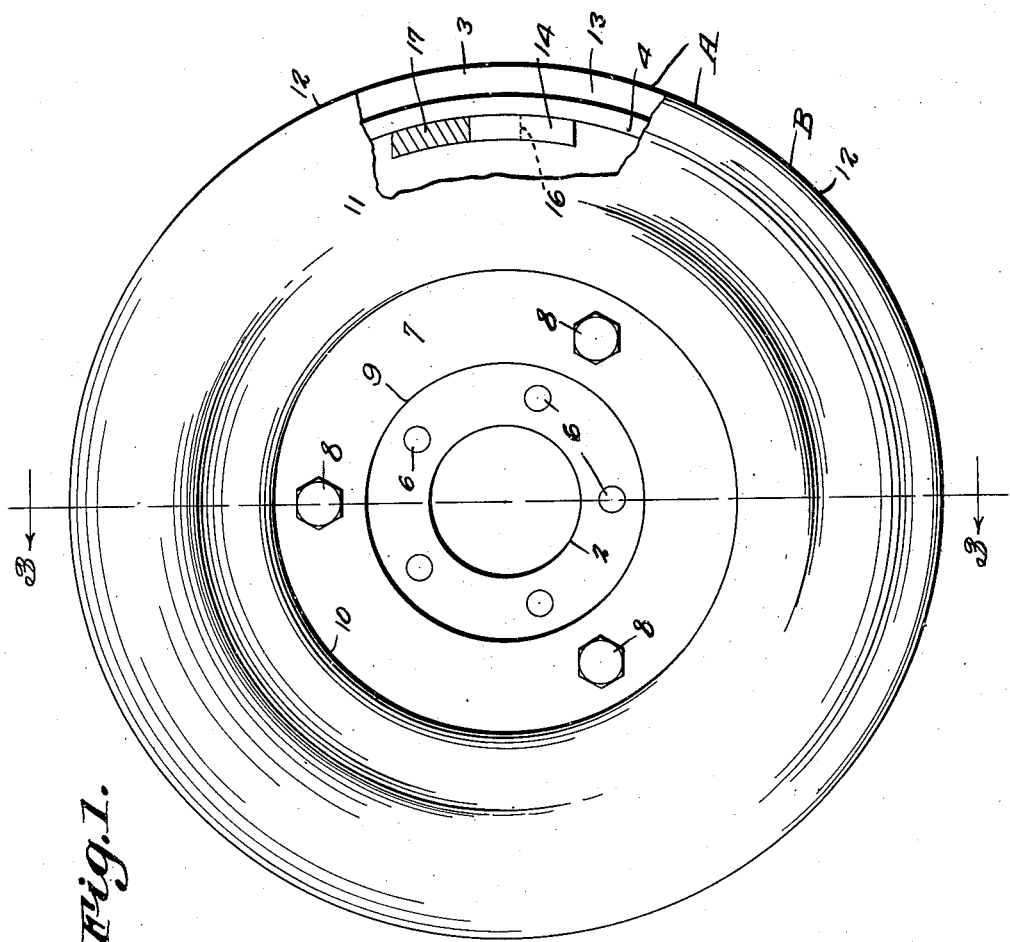

E. Kostka
INVENTOR
BY *C. A. Snow & Co.*
ATTORNEYS

Patented Feb. 15, 1949

2,461,742

UNITED STATES PATENT OFFICE 2,461,742

WHEEL

Edward Kostka, La Porte, Ind., assignor of one-half to Adam Kasperek, La Porte, Ind.

Application June 7, 1946, Serial No. 675,061

1 Claim. (Cl. 301—63)

This invention relates to wheels, and more especially to a structure whereby a vehicle tire can be quickly placed in or removed from position on the wheel without encountering the difficulties ordinarily experienced.

A further object is to provide a wheel having a removable side section which is adapted to interlock with the opposed section and to be securely fastened thereto, the two sections, when assembled, providing an annular seat for receiving and retaining the tire.

A further object is to provide a wheel the members of which can be quickly disconnected so that the tire can readily be slipped off of the rim of the wheel.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings:

Figure 1 is a side elevation of the wheel with all parts assembled, a portion being broken away.

Figure 2 is an elevation of the wheel viewed at right angles to Figure 1 and having a part broken away.

Figure 4:
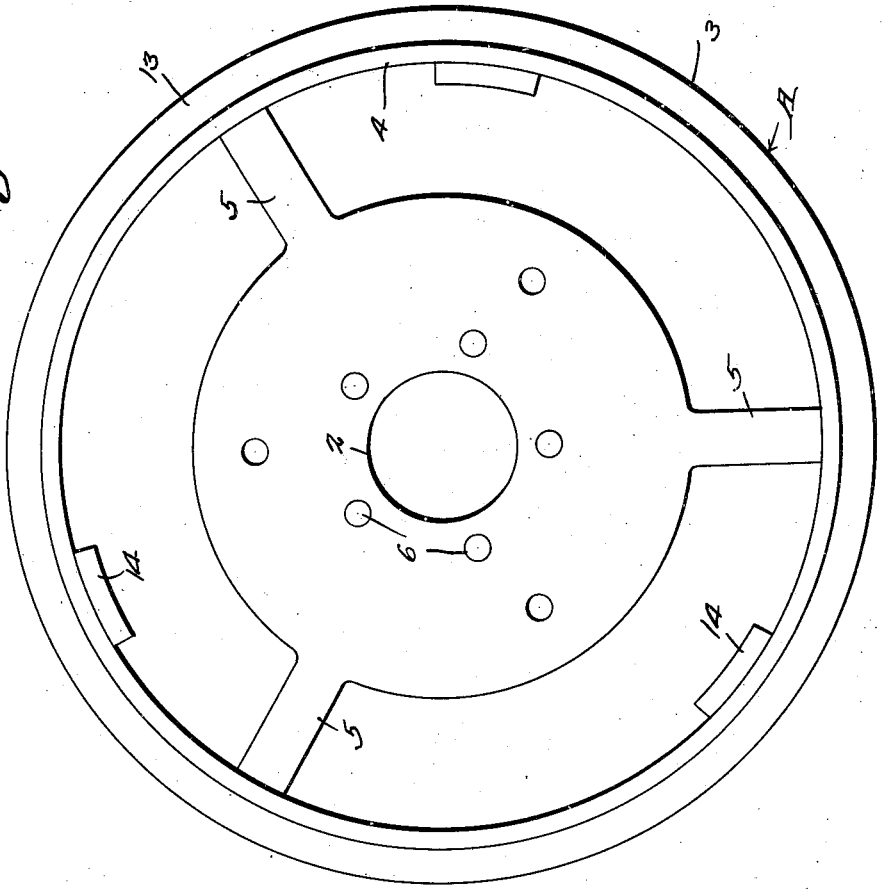
Figure 4 is a side elevation of one of the members of the wheel and showing the anterior construction thereof.
Figure 3:
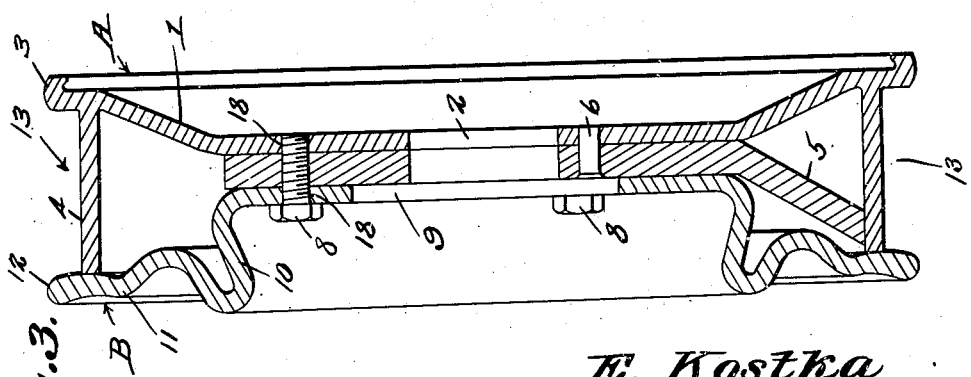
Figure 3 is a central transverse section through the wheel taken on the line 3—3 Figure 1.

Referring to the figures by characters of reference, A designates the main section of the wheel, and B designates the removable section thereof. The main section is in the form of a recessed disc 1 having the usual central opening 2 and a marginal flange or rib 3. A circular rim 4 is extended laterally from the convex side of disc 1 and is concentric with the disc. The rim can be reinforced by means of braces 5 which can be made integral with the disc 1 or can be riveted or otherwise attached thereto. As illustrated in the drawing, the braces are connected to the disc 1 by rivets 6.

The removable member of the wheel is in the form of a disc 7 adapted to be detachably secured to the disc 1 or to the inserted braces 5 by means of bolts 8 and this disc is likewise provided with a central concentric opening 9. The outer side of the disc has an integral annular flange 10 which merges into an integral annular retaining plate 11 the outer marginal portion of which provides a rib 12 which is adapted to bear against the adjacent edge of the rim 4 and to cooperate with the rib 3 to define an annular channel 13 constituting a seat for a tire, not shown.

Formed on or suitably secured to the inner surface of the rim 4 at that edge thereof remote from the disc 1 are keepers 14 in the form of lugs, one end of each lug being tapered as indicated at 15 so as to provide a cam surface. These lugs are equally spaced circumferentially and each of them is adapted to be detachably engaged by a tapered tongue 16 carried by a lug 17 secured to or formed with the inner side of the disc plate 11. These lugs 17 are spaced apart equal distances and the tongues 16 thereof are extended in such a direction that when plate 1 is given a turn in one direction relative to plate 7, the tapered ends of the tags or lugs 14 will wedge between plate 11 and tongues 16 with the result that the two plates 1 and 7 will be held together. When the parts are thus arranged openings 18 in the plates 1 and 7 are in register with each other so as to receive the bolts 8 which serve to fasten the opposed members of the wheel firmly together and hold them positively against relative rotation.

In practice the bolts 8 are removed. The plate or disc 7 is then disconnected from the rim 4 by turning it in one direction so as to disengage the tongues 16 from the lugs or keepers 14. Disc 7 can then be removed from the rim 4 and plate 1 so that a tire thus can easily be slipped onto or removed from the rim 4. Thereafter the disc 7 with its circular plate 11 are replaced and locked as before explained with the result that the ribs 12 and 3 will cooperate to close the sides of the channel 13 and thus hold the tire against displacement relative to the wheel.

The whole operation of placing a tire into position or removing it from position is greatly simplified by employing the structure herein described.

It is to be understood that the wheels can be pressed from metal or can be cast or otherwise made to meet the requirements. Furthermore the members of the wheel can be of any desired configurations transversely.

What is claimed is:

1. A wheel including a disc-like main member, an opposed disc-like removable member, marginal flanges on the members, a laterally extended rim on the main member, radial braces fixed at one end to the main member, the braces being extended angularly into engagement at their other ends with the rim, substantially wedge-shaped lugs on the inner surface of the rim, keepers on the inner surface of the removable member, the keepers having tongues spaced from said inner surface and extended substantially parallel to the peripheral edge of said member, whereby to permit wedging of the lugs between the tongues and the inner surface of the removable member, and means detachably connecting the main and removable members.

EDWARD KOSTKA.

REFERENCES CITED

The following references are of record in the file of this patent:

UNITED STATES PATENTS

| Number | Name | Date |
|---|---|---|
| 797,779 | McCan | Aug. 22, 1905 |
| 1,419,762 | Robertson | June 13, 1922 |
| 1,602,984 | McFall | Oct. 12, 1926 |
| 1,638,741 | McGinniess | Aug. 9, 1927 |

FOREIGN PATENTS

| Number | Country | Date |
|---|---|---|
| 209,113 | Great Britain | 1924 |
| 563,417 | France | 1923 |